(12) United States Patent
Schüler

(10) Patent No.: US 11,176,454 B2
(45) Date of Patent: Nov. 16, 2021

(54) OPTOELECTRONIC CODE READER AND METHOD FOR READING OPTICAL CODES

(71) Applicant: SICK AG, Waldkirch (DE)

(72) Inventor: Pascal Schüler, Waldkirch (DE)

(73) Assignee: SICK AG, Waldkirch (DE)

( * ) Notice: Subject to any disclaimer, the term of this patent is extended or adjusted under 35 U.S.C. 154(b) by 813 days.

(21) Appl. No.: 15/977,090

(22) Filed: May 11, 2018

(65) Prior Publication Data

US 2019/0019086 A1     Jan. 17, 2019

(30) Foreign Application Priority Data

Jul. 12, 2017 (EP) .................................... 17180889

(51) Int. Cl.
    *G06K 7/14*      (2006.01)
    *G06N 3/08*      (2006.01)

(52) U.S. Cl.
    CPC ............. *G06N 3/08* (2013.01); *G06K 7/1413* (2013.01); *G06K 7/1482* (2013.01); *G06K 7/1491* (2013.01)

(58) Field of Classification Search
    CPC ................................ G06K 7/14; G06K 7/1478
    USPC .... 235/462.11, 462.14, 462.24, 462.41, 375; 706/25
    See application file for complete search history.

(56) References Cited

U.S. PATENT DOCUMENTS

| | | | |
|---|---|---|---|
| 8,905,314 B2 | 12/2014 | Van Der Merwe | |
| 2007/0091997 A1* | 4/2007 | Fogg | H04N 19/102 375/240.1 |
| 2008/0029602 A1* | 2/2008 | Burian | G06K 7/10722 235/462.09 |
| 2010/0230493 A1 | 9/2010 | Akiyama et al. | |
| 2011/0068175 A1* | 3/2011 | Powers | G06K 7/1478 235/462.25 |
| 2013/0240628 A1* | 9/2013 | van der Merwe | G06K 7/1447 235/462.24 |
| 2016/0125218 A1 | 5/2016 | Deppieri et al. | |
| 2018/0373934 A1* | 12/2018 | Bridges | H04N 5/23216 |
| 2021/0124886 A1* | 4/2021 | Hawks | G06K 7/10722 |

FOREIGN PATENT DOCUMENTS

| | | |
|---|---|---|
| CN | 104268498 A | 1/2015 |
| CN | 105160339 A | 12/2015 |
| DE | 101 37 093 A1 | 2/2003 |

(Continued)

OTHER PUBLICATIONS

Fridolfsson, Machine Learning for detection of barcodes and OCR, Department of Electrical Engineering, Jun. 14, 2015.

(Continued)

*Primary Examiner* — Edwyn Labaze
(74) *Attorney, Agent, or Firm* — Nath, Goldberg & Meyer; Jerald L. Meyer

(57) ABSTRACT

An optoelectronic code reader (10) having at least one light receiving element (24) for generating image data from reception light and an evaluation unit (26) with a classifier (30) being implemented in the evaluation unit (26) for assigning code information to code regions (20) of the image date, wherein the classifier (30) is configured for machine learning and is trained by means of supervised learning based on codes read by a classic decoder (28) which does not make use of methods of machine learning.

20 Claims, 4 Drawing Sheets

(56) References Cited

FOREIGN PATENT DOCUMENTS

| | | |
|---|---|---|
| EP | 1 096 416 B1 | 12/2009 |
| EP | 3 009 984 A1 | 4/2016 |
| JP | H6-119480 A | 4/1994 |
| JP | H6-139396 A | 5/1994 |
| JP | 2008-21009 A | 1/2008 |
| JP | 2016-151800 A | 8/2016 |
| KR | 10-2012-0019964 A | 3/2012 |
| KR | 10-1293703 B1 | 8/2013 |
| WO | 2015/017796 A2 | 2/2015 |

OTHER PUBLICATIONS

Search Report dated Jan. 24, 2018 issued in corresponding European Application No. 17180889.2.

* cited by examiner

Figure 6

| Class Score | Pos1 | Pos2 | Pos3 | Pos4 | Pos5 | ... | PosN |
|---|---|---|---|---|---|---|---|
| Scan1 | StartC / 0.95 | 10 / 0.92 | 01 / 0.94 | 84 / 0.87 | MISMATCH < 0.5 | | Stop / 0.95 |
| Scan2 | MISMATCH < 0.5 | 10 / 0.82 | 01 / 0.94 | 84 / 0.91 | 53 / 0.96 | | Stop / 0.88 |
| Scan3 | StartC / 0.88 | MISMATCH < 0.5 | 01 / 0.94 | 84 / 0.96 | 53 / 0.96 | | MISMATCH < 0.5 |
| ... | | | | | | | ... |
| ScanJ | StartC / 0.95 | 10 / 0.99 | 01 / 0.94 | MISMATCH < 0.5 | 53 / 0.96 | | Stop / 0.94 |

VOTE

| Deco Result | Pos1 | Pos2 | Pos3 | Pos4 | Pos5 | ... | PosN |
|---|---|---|---|---|---|---|---|
| | StartC | 10 | 01 | 84 | 53 | | Stop |

Figure 7

| Class Score | Pos1 | Pos2 | Pos3 | Pos4 | Pos5 | ... | PosN |
|---|---|---|---|---|---|---|---|
| Voting result Image i | StartC / 0.95 | 10 / 0.92 | 01 / 0.94 | MISMATCH | MISMATCH | | Stop / 0.95 |
| Voting result Image i + 1 | StartC / 0.95 | 10 / 0.82 | 01 / 0.94 | 84 / 0.91 | MISMATCH | ... | Stop / 0.88 |
| Voting result Image j | StartC / 0.95 | 10 / 0.99 | MISMATCH | 84 / 0.93 | 53 / 0.96 | ... | Stop / 0.94 |

VOTE after image j

| Deco Result | Pos1 | Pos2 | Pos3 | Pos4 | Pos5 | ... | PosN |
|---|---|---|---|---|---|---|---|
| | StartC | 10 | 01 | 84 | 53 | | Stop |

Figure 8

OPTOELECTRONIC CODE READER AND METHOD FOR READING OPTICAL CODES

FIELD

The invention relates to an optoelectronic code reader and a method for reading optical codes, in particular bar codes.

BACKGROUND

Code readers are known from supermarket checkouts, for automatic parcel identification, mail sorting, airport baggage handling and other logistics applications. In a code scanner, a reading beam is guided across the code by means of a rotating mirror or a polygon mirror wheel. A camera-based code reader captures images of the objects bearing the codes by means of an image sensor, and image processing software extracts the code information from these images. Camera-based code readers can easily cope with code types other than one-dimensional barcodes, which are also two-dimensional like a matrix code and provide more information.

In an important class of applications, the objects bearing the codes are conveyed past the code reader. A code scanner detects the codes moved into its reading area one after the other. Alternatively, a line camera in a camera-based code reader detects the object images with the code information successively and line by line in the course of the relative movement. When using a two-dimensional image sensor, image data are recorded which overlap to a degree depending on recording frequency and conveying speed. In order for the objects to be arranged in any orientation on the conveyor, several code readers are often provided at a reading tunnel in order to record objects from several or all sides.

For a code reader or a reading tunnel, a high reading rate is one of the most important quality criteria. Reading errors cause time-consuming error corrections, such as manual scanning or manual sorting. Conventional barcode decoders use so-called edge position arrays, which are generated from gray level profiles by means of binarization techniques. Determination of edge positions and binarization methods are closely related, because an edge determination corresponds to a binary classification whether or not an edge is present. The actual decoding is done based on the specification of the respective barcode type, essentially on a 1-bit vector based on the ratios of bars to gaps corresponding to the edge position sequence.

This is a critical point in the image processing chain, since the extraction of black and white images or the binarization from the originally acquired gray level signals causes a significant loss of information, for example from an eight bit gray level value to only one bit per pixel. The generation of edge positions always introduces errors. Some exemplary reasons for these errors are small bar widths in terms of pixel resolution, very noisy or blurred signals, lack of contrast and printing errors. Therefore, some edges are not found or positioned inaccurately, with the result that codes can no longer be read (NoRead), depending on the severity of the errors. Although the example refers to barcodes, similar problems arise for two-dimensional codes.

EP 1 096 416 B1 discloses a method for reconstructing a barcode from several consecutive scans. To this end, gray level profiles covering only part of the code are combined to form an overall profile, which subsequently is decoded. This concerns a preprocessing step, because afterwards the problem of decoding the overall profile arises like before.

From EP 3 009 984 A1, a detection system for optical codes is known wherein a sequence of images is recorded during a conveying movement of objects bearing the codes. The displacement vector between two successive images is determined in order to be able to track image areas across several recordings. This does not change the decoding as such.

It has already been proposed to use neural networks for reading barcodes. For example, U.S. Pat. No. 8,905,314 B2 is about barcode detection by means of a classifier, which can be configured as a learning neural network. However, this classifier uses feature vectors containing the edge positions. This means that the input data of the classifier have already suffered the loss of information due to the binarization or edge detection as explained. Moreover, the classifier is trained based on simulated feature vectors. There is no connection to real data. In addition, conventional decoders have achieved already high performance even without machine learning. Known approaches as in U.S. Pat. No. 8,905,314 B2 therefore do not make use of the potential for a real improvement of the reading rate by means of machine learning.

SUMMARY

It is therefore an object of the invention to improve code reading with machine learning.

This object is satisfied by an optoelectronic code reader, in particular a bar code reader, having at least one light receiving element for generating image data from reception light and an evaluation unit with a classifier being implemented in the evaluation unit for assigning code information to code regions of the image date, wherein the classifier is configured for machine learning and is trained by means of supervised learning based on codes read by a classic decoder which does not make use of methods of machine learning.

The object is also satisfied by a method for reading optical codes, in particular bar codes, from image data, wherein code information is assigned to code regions of the image data by means of a classifier configured for machine learning, wherein codes are initially read by a classic decoder not making use of machine learning, and wherein the classifier is trained by supervised learning based on codes read by the classic decoder.

The code reader has a light receiving element and thus acquires image data, preferably with gray level values. For evaluation, a classifier configured for machine learning assigns code information to code regions of the image data. The code regions are preferably found by preprocessing which segments the image data, for example based on the contrast.

The invention starts from the basic idea to use a classic decoder or its decoding results, respectively, for the classifier. The classifier is trained by means of supervised learning with codes read by the classic decoder. In this respect, a classic decoder means a decoder which does not make use of machine learning methods, in contrast to the trainable classifier. Classic therefore is meant to be the opposite of machine learning. Setting and adjusting of parameters are also possible in a classic decoder, this in itself is not yet machine learning. Some practical differences are that the classic decoder is ready for its task with its programming and does not require experience or training, and that its performance is more or less the same from the very beginning throughout its use. In contrast, the performance of the classifier does not only depend on its programmed structure, but arises only in connection with the training and the quality of the training data.

The invention has the advantage that the reading rate is improved over the classic decoder and conventional machine learning classifiers for reading codes. This also works with interfering effects, like low resolution, blurred codes, defects and noise. The classifier is capable of adapting to specific reading situations and application-specific properties of codes, such as split bars, contrast problems caused by strong or weak printing, faded codes and the like. This adaption can take place during the original training and even online during the reading operation. Since the classic decoder virtually has the role of labeling training data, necessary training data of high quality for an initial training or adaptation can be generated in a very simple manner.

The code reader preferably is configured as a code scanner and comprises a light transmitter with transmission optics for transmitting a reading beam and a movable deflection unit for periodically deflecting the reading beam in the detection area. Throughout this specification, the terms preferred or preferably refer to an advantageous, but completely optional feature. The scanning results in a remission value for the respective scanning angle, so that a code scanner effectively records image data line by line. Alternatively, the code reader is camera-based. In many important applications, code reader and detection area are in relative motion, such as when a handheld device is moved over the detection area or when the code reader is mounted at a conveyor belt for reading codes on objects conveyed thereon. Due to these relative motions, an object and a code region are successively recorded line by line, so that not only image lines, but two-dimensional images are generated. This applies to both code scanners and a line camera in a camera-based code reader. Two-dimensional image sensors are also possible, which directly record a larger image section. For reading a barcode, lines through the image data are considered which may or may not correspond to the scanning direction or the camera line. Along these lines, the image data provide a gray level profile to be decoded.

The classic decoder preferably is configured to process black and white image information. Therefore, there is a preprocessing which also may be part of the classic decoder for obtaining appropriate black and white information from the gray level profiles. Such classic decoders are available, and they already achieve a very high reading rate despite the problems explained in the introduction.

The classic decoder preferably is configured to binarize the image data and/or determine edge positions in the image data. Thus, as explained in the introduction, the gray level profiles effectively become a 1-bit vector, and from the sequence of bars and gaps thus available, the classic decoder determines the code content.

The classifier preferably assigns code information to code regions based on gray level information of the image data. The classifier therefore is a gray level decoder, which does not work with 1-valued binary data but with the gray level profile, unlike the classic decoder in a preferred embodiment. A reduction of the bit depth of the gray levels is conceivable, but also results in a loss of information. Consequently, the classifier is also trained with gray level profiles in this embodiment, not with the binarized data or edge positions for the classic decoder, which only provides the code result or labeling. Ultimately, the classifier uses more information, namely the gray level information, than the classic decoder which evaluates the training data. This is one reason for the increased reading rate according to the invention: The classifier uses the full input information of the gray level profiles up to the decoding of the code or the individual characters, so that the known problems with binarization or edge position determination do no longer have any impact.

The classifier preferably comprises a neural network or a support vector machine. These are proven examples of machine learning, for which numerous suitable algorithms and architectures are available. Other methods of machine learning such as Random Forest Trees would also be conceivable.

The classifier preferably also determines a measure of reliability for the respective assignment of code information to a code region. Up to now, only a failure to read a code has been considered as a read error (NoRead). There is also the possibility that at least one character has been read with an incorrect value (Misread). To a certain extent, such errors can be detected or even eliminated by correction methods and checksums, and these methods are also available to a code reader with a classifier based on machine learning. However, it is useful if the classifier evaluates the probability of a Misread. It can even be parametrized via a threshold in that a required probability for a Misread is specified and compared with the measure of reliability.

The evaluation unit preferably is configured to divide code regions into individual code elements, wherein the classifier only decodes one code element per step. The classification usually is not time-critical, otherwise it would also be possible to have several instances of the classifier decode code elements in parallel. In principle, a classifier could learn and later distinguish longer sequences, but would have to separate a largely increased number of classes and be trained with considerably higher costs. Therefore, it is advantageous to classify stepwise for only one code element at a time.

The evaluation unit preferably is configured to locate a start character and/or a stop character by means of the classic decoder and/or the classifier, and to divide the code region in between into the individual code elements. In the usual standards, the individual code elements have an equal length, so that with knowledge of code start and code end the region in between can be distributed to the number of code elements which likewise is known depending on the code type. Locating the start and stop characters is possible both by the classic decoder and the classifier, which preferably searches from both ends of the gray level profile towards the center.

The classic decoder preferably is also implemented in the evaluation unit. Alternatively, it is conceivable to obtain the reading results of the classic decoder from another device or externally on the basis of the image data. For the operation of the code reader, the trained classifier is sufficient after the training or learning phase. Nevertheless, it is useful for a variety of reasons if the classic decoder is available in the same device in addition to the classifier.

The evaluation unit preferably is configured to read a code by assigning code information to image data of a code region with the classic decoder and the classifier. This means trying to read the code both ways, be it parallel or in succession. If only one method is able to read the code, that result will be used. If there are different reading results, it can for example be decided on the basis of the reliability measure whether the classifier actually overrules the classic decoder. It is also conceivable to specify from the beginning which method takes precedence in those cases. If both methods succeed only in partial decoding, partial results can be combined.

The classifier preferably is used only to read codes which could not be read by the classic decoder. With the classic decoder, reading rates of up to 99% can already be achieved. If the classifier only is used for the remaining cases, the existing decoder quality is not endangered; on the contrary, it can only get better because the classifier may still decipher previously unreadable codes. Although an error rate of 1% seems low, there is great economic interest in further reducing it. Incidentally, the numerous reading operations in which the code is already read by the classic decoder can be used for verifying the classifier or its further training. This in particular adapts to slow drifts which change the quality or other properties of the codes or the image recording in the course of operation.

The evaluation unit preferably is configured to repeat the assignment of code information to code regions for different lines through the image data and to subsequently combine partial results into a common code content, in particular based on a voting method. The information in a barcode is only coded in one dimension. Nevertheless, it also has a transverse extension so that different reading lines can be placed and thus multiple gray level profiles can be obtained. Depending on the image errors and image variations, such gray level profiles may allow the decoding of different partial regions. The measure of reliability is particularly useful as a weighting of the votes or individual partial contributions from a respective reading so that unreliable and therefore possibly incorrect partial results do not contribute.

The evaluation unit preferably is configured for code reading across images, wherein code regions are tracked between image data generated at different points in time, code information is assigned to respective code elements in the code regions thus multiply recorded, and the code information subsequently is combined into the code content. In some cases it is not sufficient to evaluate several gray level profiles from the same image, for example because an image defect extends over the entire height. In the case of two-dimensional codes, a problem already arises with image errors which extend only locally and not over the entire width or height. In many applications, such as in a reading tunnel, the same code region is detected multiple times in the course of a relative movement. In that case, code regions can be tracked based on the relative motion, and the entire code is combined across images from partial decoding in individual images. Again, a voting method similar to the partial decoding over several reading lines in the same image is conceivable. The composition of several partial readings in the same image and across images can also be combined.

The method according to the invention can be modified in a similar manner and shows similar advantages. Further advantageous features are described in an exemplary, but non-limiting manner in the dependent claims following the independent claims.

In particular, the classic decoder preferably reads codes based on binarized image data or an edge detection in the image data, wherein the classifier assigns code information to code regions based on gray level information of the image data.

BRIEF DESCRIPTION OF THE DRAWINGS

The invention will be explained in the following also with respect to further advantages and features with reference to exemplary embodiments and the enclosed drawing. The Figures of the drawing show in:

FIG. 6 a tabular representation of a plurality of decoding attempts and their combined evaluation by means of a voting method;

FIG. 7 a tabular representation of a plurality of decoding attempts similar to FIG. 6, but across several images instead of several reading attempts in the same image; and FIG. 8 an example of two images of the same code, where image errors change due to different recording situations.

DETAILED DESCRIPTION

Figure 1:
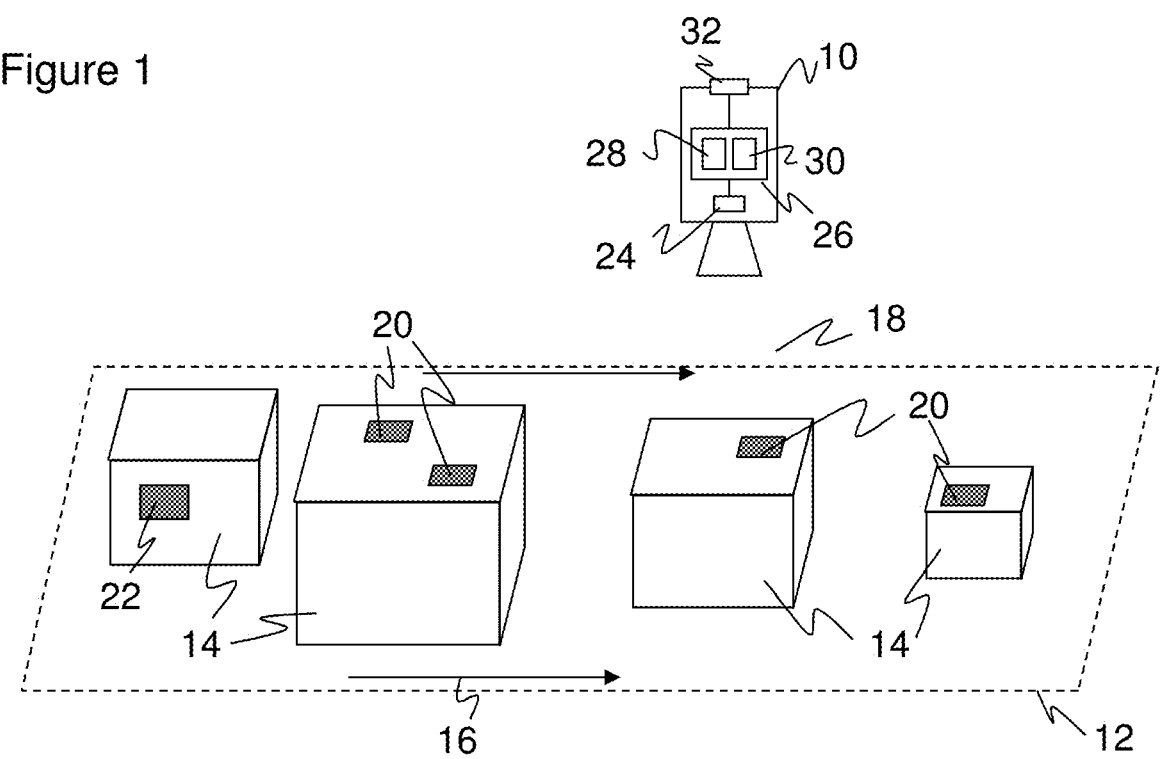
FIG. 1 a schematic three-dimensional overview representation of the exemplary mounting of a code reader above a conveyor belt where objects bearing codes to be read are conveyed.

FIG. 1 shows an optoelectronic code reader 10 which is mounted above a conveyor belt 12 conveying objects 14, as indicated by arrow 16, through the detection area 18 of the code reader 10. The objects 14 bear code regions 20 at their outer surfaces which are detected and evaluated by the code reader 10. These code regions 20 can only be detected by the code reader 10 if they are arranged on the top or at least visible from above. Therefore, unlike the illustration in FIG. 1, a plurality of code readers 10 can be mounted from different directions for reading a code 22 which is attached at the sides or on the bottom, thus enabling a so-called omni-reading from all directions. The plurality of code readers 10 in a reading system usually are arranged as a reading tunnel. The stationary application of the code reader 10 at a conveyor belt 12 is a very relevant example. However, the invention relates to the code reader 10 itself and its decoding method, so that the example should not be construed as limiting.

The code reader 10 detects image data of the conveyed objects 14 and the code regions 20 by means of a light receiver 24, which are evaluated by an evaluation unit 26 by means of image processing and decoding methods. The invention does not depend on any specific imaging method, so that the code reader 10 can be of any known construction. For example, only one line is detected at a time, be it by means of a line-shaped image sensor or a scanning method, and the evaluation unit combines the lines acquired in the course of the conveying movement into the image data. With a matrix-type image sensor, a larger area can already be detected in one shot, while combining images both in the conveying direction and the transverse direction still is conceivable.

The main task of the code reader 10 is to identify the code regions 20 and to read the codes. To this end, a classic decoder 28 and a classifier 30 operating according to principles of machine learning are implemented in the evaluation unit 26. The decoding method will be explained in detail below with reference to FIGS. 2 to 8. The classic decoder 28 primarily is used to train the classifier 30, so that, unlike in FIG. 1, in some embodiments there is no classic decoder 28 in the code reader 10. However, in preferred embodiments, the classic decoder 28 is also used during operation for reading codes, for simplifying the training, in particular a re-training or adaptive training, or a validation, or for at least performing subtasks such as segmenting into code elements.

Via an interface 32, the code reader 10 outputs information, such as codes which have been read, or image data. The functionality of the classic decoder 28 and/or of the classifier 30 can also at least partially be provided externally by utilizing the interface 32, for example by connection to a network or a cloud. For example, the time and processing intensive training may take place externally. The classifier 30 in this case only receives the learning result, such as the weighting factors of a neural network, and can then be used for code reading.

Figure 2:
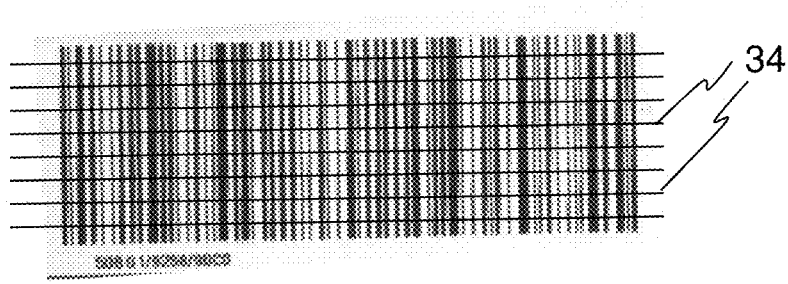
FIG. 2 an example of image data of a code with several scanning lines along which gray level profiles for decoding the code are obtained.

FIG. 2 shows an example of image data of a code region 20 acquired with the code reader 10. For the decoding of a barcode, an image line is sufficient, provided that it is not parallel to the code elements. Therefore, with appropriate orientation, numerous reading lines 34 are available. A preceding segmentation for locating the code region 20 in the image data as well as identifying a suitable orientation of the reading lines 34 are known per se and therefore not explained.

Figure 3:
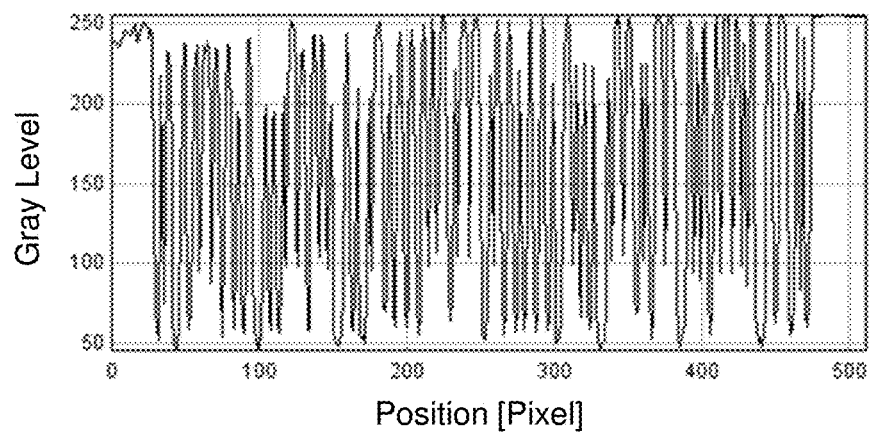
FIG. 3 an exemplary gray level profile.

For now, the consideration is limited to one of these reading lines 34. FIG. 3 shows a corresponding gray level profile, i.e. the intensity curve or the image line, respectively, along the reading line 34. Decoding means assigning the code content according to the specification of the code type to this gray level profile. There are code types where the code information directly corresponds to a character, as in Interleaved 2/5. In other cases like Code 128, the code information also depends on the state of an internal decoder mode (CodeC-Table, modes like Shift, function character FNC) and is only detected in a raw format which subsequently needs to be converted. Here, these cases will no longer be distinguished, but it is assumed for the sake of simplification that the assigned code information already is the desired result.

The classifier 30 is intended to increase the reading rate compared to the classic decoder 28. As a preparatory step, the classifier 30 is trained. The training may be an online training during the reading operation with the classic decoder 28, in particular as a further training for additional adaption. With the trained classifier 30, an improved decoding is possible.

In the following, at first the learning or training phase and subsequently the operating or evaluation phase will be described in a preferred embodiment. Numerous variations are possible according to the invention, in particularly preferred embodiments described by features of the dependent claims.

In the learning phase, the classic decoder 28 is used as a supervisor or trainer of the classifier 30. Numerous gray level profiles are generated as training data from the image data acquired by the code reader 10 or a comparable device. The classic decoder 28 in the vast majority of cases is able to read the corresponding codes, so that the meaning or content of the gray level profiles is known. Gray level profiles causing a read error (NoRead) of the classic decoder 28 preferably are discarded during this learning phase. The training data can be generated in the course of the usual operation of the code reader 10 and may directly be used online for a successive training. On the other hand, it is also possible to collect training data in a data base, with a learning phase independent from the operation, wherein either the classic decoder 28 also stores its reading result in the data base or generates the reading result during the training. In principle, this labeling of training data, i.e. the assignment of the correct code contend to a gray level profile, could be done in any other way, but in the classic decoder 28, there already is a simple and reliable way, and the invention preferably makes use of this possibility.

Figure 4:
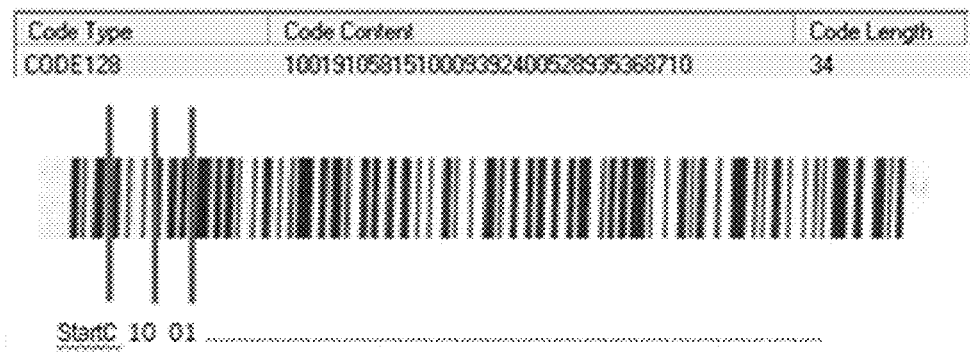
FIG. 4 an illustration of an exemplary bar code for explaining code elements or individual characters.

As part of the decoding by the classic decoder 28, an edge position array may quite conventionally be generated, and this is processed character by character until there is a complete reading result. Based on the code content, the edge position array and the code type, it is known where the individual code elements are located. FIG. 4 illustrates this with an exemplary code with some separating lines for individual code elements being drawn at the code beginning. Below that, the decoded character of the respective code element is written. From this, segments of the gray level profile can be obtained which correspond to the respective character.

Each code that has been read therefore provides a number of training data sets corresponding to the code length, each training data set containing a segment of a gray level profile and its correct classification, namely the meaning or code content. In practice, the segment of the gray level profile should preferably be normalized in size and contrast prior to the training in order to be independent of application parameters later in the evaluation phase, such as varying bar widths, reading distances, object heights, contrast variations and similar effects.

Figure 5:
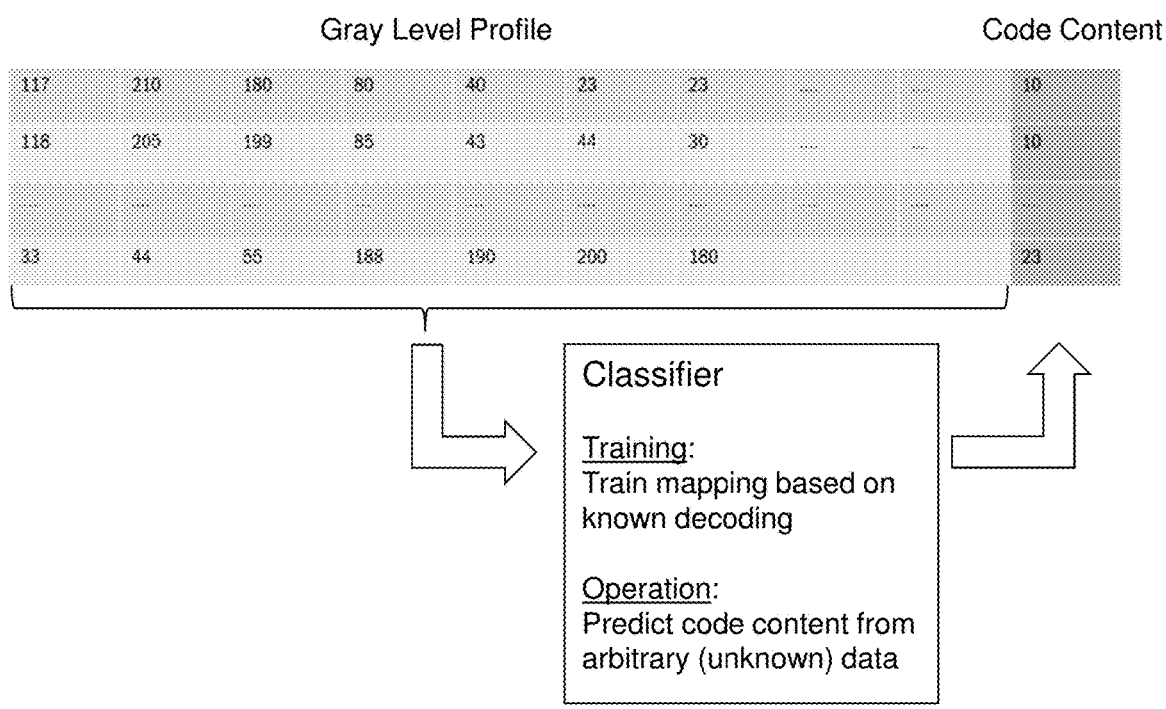
FIG. 5 a tabular representation of a plurality of gray level profiles and corresponding code contents for illustrating training and operation of a classifier with machine learning.

FIG. 5 shows a tabular overview. In the left part of the table, there is a segment of a gray level profile in the respective lines, while the corresponding code content is on the right. In the learning phase, this relationship is trained in the classifier 30. The segments of the gray level profiles are the inputs (features), while the code content provides the associated and known labels or classes (target variable).

Various algorithms or implementations of a multi-class classifier 30 with machine learning are possible, such as neural networks, multi-class support vector machines, random forest trees, and others. In addition to the implementation effort and the required hardware, selection criteria above all are the quality, i.e. the actual improvement of the reading rate, and also the evaluation speed. In principle, a correlator which does not use machine learning and directly correlates newly read segments of a gray level profile with stored segments of known content would also be conceivable. The correlation coefficient would even provide a confidence level for the correctness of the decoded character. However, such a brute force algorithm requires a lot of computational effort and will be inferior for reasons of long runtime alone. In addition, this correlator would lack the adaptability to new and unknown machine learning situations.

After the training phase with sufficient individual character results, preferably with each character of the character set of the bar code type to be read, the evaluation phase can start, which is the reading operation where the classifier 30 actually is used for decoding and increasing the reading rate. For a pre-trained classifier 30, there is no learning phase. This may for example happen when a classifier 30 which already has been trained is directly transferred from one device to another or transferred via a network or cloud.

The representation of FIG. 5 also applies for this situation of the evaluation phase. The difference is that, now, the gray level profiles shown on the left side of the table represent new, unclassified data. In contrast to the training, the code content shown on the right is no longer known, but is estimated or predicted by the classifier 30. The relationships of the training data are now mapped in the model of the classifier 30, for example in the form of weighting factors of a neural network.

The classic decoder 28 is not necessarily needed in the evaluation phase. However, in a preferred embodiment, decoding may continue to be done primarily by the classic decoder 28. Only if this decoding fails, the classifier 30 is used to possibly still read a code. In this embodiment, the classification with methods of machine learning is used as an extension, specifically as a retry attempt in case of read errors (NoReads) of the classic decoder 28. This has the advantage that the high reading rates and short decoding times which already have been achieved with the classic decoder 28 are not endangered.

It is also conceivable to use the classic decoder 28 for subtasks such as the recognition of start and stop character positions of the corresponding code type. For this purpose, the classic decoder 28 should provide the required output functionality. The classic decoder 28 is not really necessary because the classifier 30 can also find start and stop characters, which are gray level profiles with corresponding code content like any other character. The search preferably begins at both ends and continues towards the center.

Once start and stop characters are located, the number of characters is estimated on the basis of the specific code type and the dimensions of the start and stop characters in pixels, and then the gray level profile between start and stop characters is divided equidistantly into the corresponding number of segments of the gray level profile. The individual segments of the gray level profile are normalized similar to what is done in the learning phase. Thus, the gray level profiles as in the left part of FIG. 5 are obtained, and the classifier 30 assigns the code content shown in the right part to them.

Ideally, the classifier 30 succeeds in decoding all segments of the gray level profile. However, the situation is not always ideal, especially in embodiments where the classifier 30 is only used to compensate for the rare read errors of the classic decoder 28 and thus regularly has to process problematic cases. In addition, a classifier 30 may also be implemented so that there is always a classification result, but not necessarily the correct one.

It is therefore advantageous if the classifier 30 also provides a confidence measure or measure of reliability (score, confidence level) in addition to the classification. This can be used to evaluate whether the reading result from a single gray level profile is sufficiently reliable (no Misread).

As illustrated in FIG. 2, in the case of bar codes, there is not only one possible reading line 34. This redundancy can be used to further reduce read errors. To this end, the decoding is carried out several times each with the gray level profile of one reading line 34. This results in a plurality of associated segments of the plurality of gray level profiles for each code element.

These decoding results are shown by way of example in tabular form in FIG. 6. This table is also called voting matrix. Therein, Pos1 . . . PosN denotes the various code elements. The various repeated reading attempts each along a different reading line 34 are shown in the lines Scan1 . . . ScanJ. The individual entries of the table have the format code content/measure of reliability. For example, in Scan1 at Pos3 the value 01 has been decoded with a reliability of 0.94.

A majority decision is made for each column (Voting). There may be a weighting with the measure of reliability. The result, the commonly determined code content, is shown in the bottom line in FIG. 6.

In this example, a reliability <0.5 already is considered unreliable, i.a. as an erroneous assignment or not reliably classifiable. It may happen that a column comprises nothing but unreliable entries. For those column positions, the classifier 30 was ultimately unable to read the code even from multiple reading lines 34, at least not with the required reliability.

With an even more stringent criterion, it is required that there should be more than an i-fold reliable classification. That means that if there is a reliability ≥0.5 only i times or less in one column, the overall result is considered to be invalid. The ratio between the errors (NoRead, Misread) can be adapted via i and the reliability threshold, in the example 0.5.

Combining reading results across multiple reading lines 34 is no longer possible if an image defect extends over the entire height of the barcode. Even then, the code may still be read across images. FIG. 7 shows an example in tabular form. The table corresponds to FIG. 6, with the difference that the lines no longer correspond to different reading lines 34 within the same image, but to one respective read line 34 from a different image of the same code. Both can also be combined by evaluating multiple reading lines 34 from multiple images.

This is illustrated in FIG. 8 showing two images of the same code in different recording situations, in particular two consecutive conveying positions which are close enough to one another so that the same code is detected in both instances. Due to reflections, code regions are not recognizable in each case. However, the affected image regions differ.

The motion vector from image to image can be determined using a tracking algorithm. As a result, the gray level profiles can correctly be superimposed across images and thus be used for a multiple reading. As long as the gaps, or the code characters decoded with insufficient reliability, respectively, are caused by a moving defect, which often is the case when detecting codes under a reflective foil, the code possibly still is read after a certain number of frames. In the example of FIG. 7, the common code no longer contains any gaps after the voting process, although all the contributing individual readings were incomplete. Thus, a read error (NoRead) from all individual images is compensated.

The invention has been described using barcodes as an example. While sometimes specific types of codes are shown, the invention is not limited to any particular type of code. If 2D codes are to be read, there are some differences, such as that a line-shaped gray level profile no longer represents the entire code. Instead, the gray level information for each code character needs to be segmented in a different way according to the standard of the 2D code to be read. Nevertheless, there are gray level patterns which correspond to a code character. Thus, the invention is also readily applicable to 2D codes, in particular stacked code types such as PDF417, where the classifier 30 classifies the PDF417 code words of the corresponding three clusters.

The invention claimed is:

1. An optoelectronic code reader (10) having at least one light receiving element (24) for generating image data from reception light and an evaluation unit (26) with a classifier (30) implemented in the evaluation unit (26) for assigning code information to code regions (20) of the image date,
    wherein the classifier (30) is configured for machine learning and is trained by means of supervised learning based on codes read by a classic decoder (28) which does not make use of methods of machine learning,
    and wherein the evaluation unit (26) is configured to repeat the assignment of code information to code regions (20) for different lines (34) through the image data and to subsequently combine partial results into a common code content.

2. The code reader (10) of claim 1, wherein the classic decoder (28) is used as a trainer of the classifier (30).

3. The code reader (10) of claim 2, the code reader (10) being a bar code reader.

4. The code reader (10) of claim 2, wherein the classic decoder (28) is configured to process black and white image information.

5. The code reader (10) of claim 2, wherein the classic decoder (28) is configured to at least one of binarize the image data and determine edge positions in the image data.

6. The code reader (10) of claim 2, wherein the classifier (30) assigns code information to code regions (20) based on gray level information of the image data.

7. The code reader (10) of claim 2, wherein the classifier (30) comprises a neural network or a support vector machine.

8. The code reader (10) of claim 2, wherein the classifier (30) also determines a measure of reliability for the respective assignment of code information to a code region (20).

9. The code reader (10) of claim 2, wherein the evaluation unit (26) is configured to divide code regions (20) into individual code elements, and wherein the classifier (30) only decodes one code element per step.

10. The code reader (10) of claim 9, wherein the evaluation unit (26) is configured to locate at least one of a start character and a stop character by means of the classic decoder (28) and/or the classifier (30), and to divide the code region (20) in between into the individual code elements.

11. The code reader (10) of claim 2, wherein the classic decoder (28) is also implemented in the evaluation unit (26).

12. The code reader (10) of claim 11, wherein the evaluation unit (26) is configured to read a code by assigning code information to image data of a code region (20) with the classic decoder (28) and the classifier (30).

13. The code reader (10) of claim 11, wherein the classifier (30) is used only to read codes which could not be read by the classic decoder (28).

14. The code reader (10) of claim 2, wherein the combination is based on a voting method.

15. The code reader (10) of claim 1, wherein the combination is based on a voting method.

16. An optoelectronic code reader (10) having at least one light receiving element (24) for generating image data from reception light and an evaluation unit (26) with a classifier (30) implemented in the evaluation unit (26) for assigning code information to code regions (20) of the image date,
    wherein the classifier (30) is configured for machine learning and is trained by means of supervised learning based on codes read by a classic decoder (28) which does not make use of methods of machine learning, and wherein the classic decoder (28) is used as a trainer of the classifier (30),
    and wherein the evaluation unit (26) is configured for code reading across images, wherein code regions (20) are tracked between image data generated at different points in time, code information is assigned to respective code elements in the code regions (20) thus multiply recorded, and the code information subsequently is combined into the code content.

17. The code reader (10) of claim 16, wherein the evaluation unit (26) is configured to repeat the assignment of code information to code regions (20) for different lines (34) through the image data and to subsequently combine partial results into a common code content.

18. A method for reading optical codes from image data, wherein code information is assigned to code regions (20) of the image data by means of a classifier (30) configured for machine learning,
    wherein codes are initially read by a classic decoder (28) not making use of machine learning,
    wherein the classifier (30) is trained by supervised learning based on codes read by the classic decoder (28),
    and wherein the classic decoder (28) is used as a trainer of the classifier (30)
    and wherein an evaluation unit (26) is configured for code reading across images, wherein the code regions (20) are tracked between image data generated at different points in time, code information is assigned to respective code elements in the code regions (20) thus multiply recorded, and the code information subsequently is combined into the code content.

19. The method of claim 18, wherein the optical codes are bar codes.

20. The method of claim 18, wherein the classic decoder (28) reads codes based on binarized image data or an edge detection in the image data, and wherein the classifier (30) assigns code information to code regions (20) based on gray level information of the image data.

* * * * *